United States Patent [19]

Horii

[11] Patent Number: 4,586,613
[45] Date of Patent: May 6, 1986

[54] METHOD AND APPARATUS FOR SORTING FRUITS AND VEGETABLES

[75] Inventor: Taichi Horii, Shizuoka, Japan

[73] Assignee: Kabushiki Kaisha Maki Seisakusho, Hamamatsu, Japan

[21] Appl. No.: 515,889

[22] Filed: Jul. 21, 1983

[30] Foreign Application Priority Data

Jul. 22, 1982 [JP] Japan .................. 57-128246

[51] Int. Cl.⁴ ............... B07C 5/00; B07C 5/04; B07C 5/28
[52] U.S. Cl. .................. 209/556; 198/365; 198/706; 209/586; 209/587; 209/592; 209/912; 209/933
[58] Field of Search .......... 209/551, 555, 556, 558, 209/576, 580, 586, 587, 592, 593, 596, 598, 912, 582, 939, 581, 933; 198/365, 802, 706

[56] References Cited

U.S. PATENT DOCUMENTS

| | | | |
|---|---|---|---|
| 3,032,191 | 5/1962 | Clukey | 209/556 |
| 3,930,994 | 1/1976 | Conway et al. | 209/698 |
| 3,930,995 | 1/1976 | Paddock et al. | 209/698 |
| 4,031,998 | 6/1977 | Suzuki et al. | 198/365 |
| 4,035,636 | 7/1977 | Tengsater | 209/580 |
| 4,106,628 | 8/1978 | Warkentin et al. | 209/556 |
| 4,122,951 | 10/1978 | Alaminos | 209/939 |
| 4,324,335 | 4/1982 | Conway et al. | 209/587 |
| 4,417,817 | 11/1983 | Bohme et al. | 356/380 |
| 4,426,006 | 1/1984 | Horii et al. | 209/912 |

FOREIGN PATENT DOCUMENTS

| | | | |
|---|---|---|---|
| 2477042 | 9/1981 | France | 209/555 |
| 14-33455 | 11/1939 | Japan . | |
| 51-86448 | 7/1976 | Japan . | |
| 52-159957 | 12/1977 | Japan . | |
| 53-148943 | 11/1978 | Japan . | |
| 55-29760 | 3/1980 | Japan . | |
| 56-11978 | 3/1981 | Japan . | |
| 56-11980 | 3/1981 | Japan . | |
| 56-33957 | 8/1981 | Japan . | |
| 56-38268 | 9/1981 | Japan . | |
| 57-8770 | 1/1982 | Japan . | |
| 57-12864 | 1/1982 | Japan . | |
| 1569739 | 6/1980 | United Kingdom . | |

*Primary Examiner*—Robert B. Reeves
*Assistant Examiner*—Donald T. Hajec
*Attorney, Agent, or Firm*—Wenderoth, Lind & Ponack

[57] ABSTRACT

In a method and an apparatus for sorting fruits and vegetables which is arranged to convey fruits and vegetables of various shapes such as spheroidal shapes, spherical massive shapes, non-spherical massive shapes or amorphous shapes one by one on a tray device, a measuring device including a planar-shape dimension measuring unit, a side-shape dimension measuring unit and a weight measuring unit is arranged at a part of a conveying path to sort and rank the object to be sorted by comparing the results of measurement with sorting classification values preset by a computing device. The measuring device permits selection of the planar shape, side shape or weight. The apparatus includes a fruit or vegetable distribution section which includes receiving bins of different sizes determined according to ranking by the measuring device. One or plurality of the objects are dispersively discharged into these bins by a discharge device according to the sizes of the bins.

9 Claims, 28 Drawing Figures

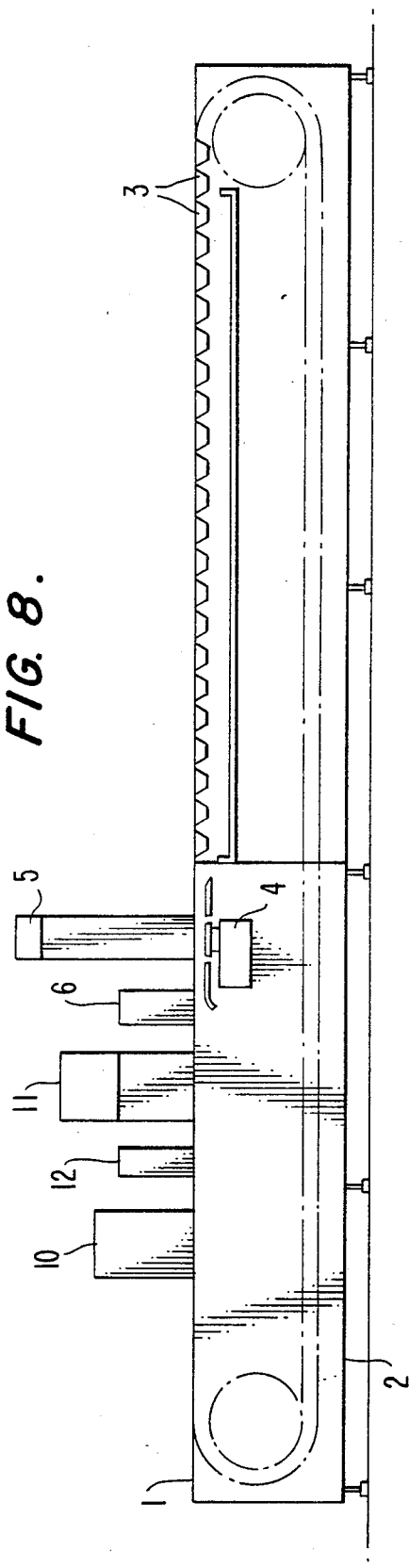
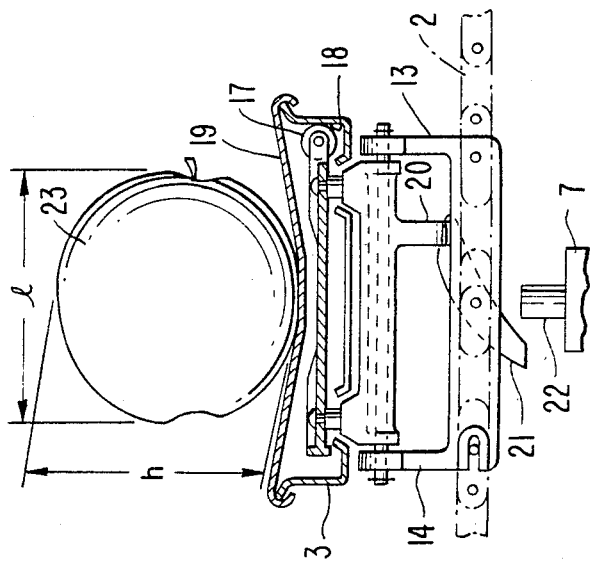
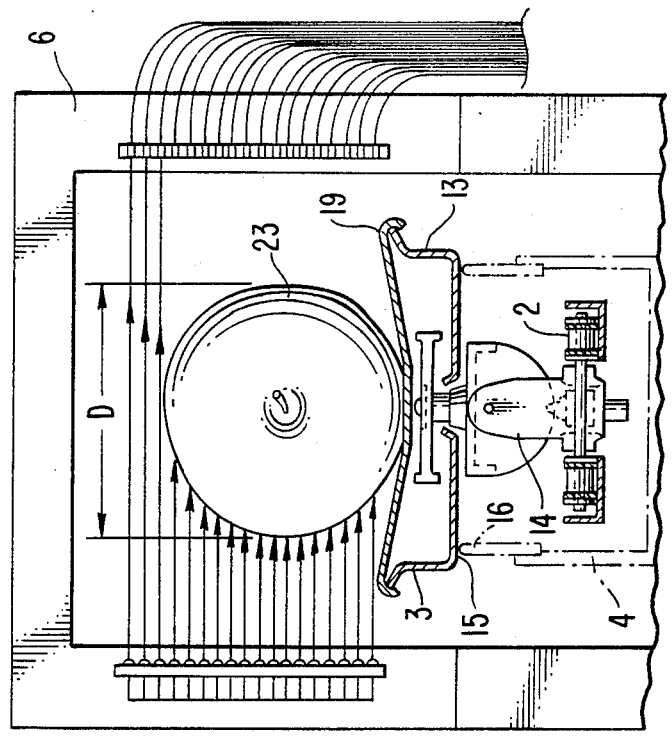
FIG. 8.
FIG. 11.
FIG. 10.

METHOD AND APPARATUS FOR SORTING FRUITS AND VEGETABLES

BACKGROUND OF THE INVENTION

1. Field of the Invention

This invention relates to a method and an apparatus for sorting fruits such as apples, peaches, pears, persimmons and tangerines and vegetables such as tomatos, melons and water melons according to sorting standards and the standards desired in the market of destination (the areas of consumption).

2. Description of the Prior Art

The grading standards define quality in terms of appearance and do not show it in specific values because the definition is based on judgement by visual examination. Each fruits sorting facility is, therefore, training sorters by showing them grade samples (either the actual fruits or color pictures). However, the results of such grading judgement by sorters varies and are inconsistent due to the persons, sorting time zones, sorting facilities and areas. As a result of such inconsistently, a fruit judged to be "good" sometimes tastes better than a fruit of the same kind judged to be "excellent". This has lowered the reliability of quality grading.

To solve this problem, therefore, research has been conducted during recent years for measuring apparatuses using sensors of various kinds. However, with the exception of some special types that are applicable only to a specific subject among many subjects of inspection and some test apparatuses, these apparatuses have not been put into practice as yet.

These sorting apparatuses of the prior art perform sorting by standards for classification by weight or standards for classification by outside dimensions. They are arranged to sort solely by weight or solely by shape according to their specific purposes and are thus arranged in varied manners. The apparatuses of the type arranged to sort by weight permit sorting without ambiguities irrespectively of difference in the operator and the machine, because weight measurement do not involve any factors of inconsistency except the mechanical performance of the apparatus used.

The sorting apparatuses of the type sorting by shape on the other hand have the following problem: The objects to be sorted include objects that have a distinct measuring position or point such as the length of a cucumber or the diameter of a tangerine (the diameter of a sieve opening) and those that have an indistinct measuring position or point such as the outer diameter of a somewhat distorted spherical mass such as apples, peaches, pears, melons, etc. which have longer and shorter diameters. The former type has a distinct measuring point and has no factor of inconsistency except the performance of the machine irrespective of differences in the operator and the machine. In the case of the latter type, however, the indistinct measuring point results in inconsistent and ambiguous results of measurement according as the operator and/or the machine varies.

In view of the above, there have been proposed various universal shape sorting apparatuses for fruits and vegetables of spherical mass shapes. Typical examples of the sorting apparatuses of this kind include shape sorting apparatuses of the mechanical contact type measuring distance between two points (called a gap type) which have been disclosed in Japanese Patent Publication No. Sho 56-38268 and Japanese Utility Model Application Laid-Open No. Sho 51-86448 umbrella shaped spheroidal shape sorting apparatuses of the whole circumference contact type which have been disclosed in Japanese Utility Model Publication No. Sho 39-33455 and Japanese Utility Model Publication No. Sho 56-11978; sorting apparatuses of the light beam type arranged to measure the outer diameter of an object in a non-contact manner which have been disclosed in Japanese Utility Model Publication No. Sho 56-33957 and Japanese Patent Application Laid-Open No. Sho 55-29760; and a shape sorting apparatus of the type arranged to pick up an image by means of a TV camera and to compute the area of the image as disclosed in Japanese Utility Model Publication No. Sho. 56-11980.

The shape sorting apparatus of the contact type measuring the distance between two points is shown in FIG. 1 of the accompanying drawings. In this case, a fruit is laid down in a sidewise posture and its body diameter is measured through a gap distance between two points. The arrangement permits simplification of the apparatus. The fruit can be smoothly discharged as it is to be rolled sidewise in discharging it. The skin of the fruit is not damaged by its stem as it is to be rolled sidewise when discharged. However, the imperfect spherical shape of the fruit which has larger and smaller diameter portions lowers the accuracy of the sorting operation of the apparatus. The inaccurate sorting then necessitates use of human judgement at the time of packing and packaging. The apparatus of this type is therefore inferior in terms of efficiency and labor saving.

The shape sorting apparatus of the whole circumference contact type is shown in FIGS. 2 and 3. Each fruit is vertically put into an umbrella-shaped device. It may appear that the fruit can be accurately sorted by the diameter of the girth of the fruit. However, even a slight vibration causes a difference in the falling point of the fruit. Besides, the structural arrangement of the apparatus is complex. Another shortcoming of this type resides in the relatively long falling distance of the fruit which tends to damage the fruit due to the falling impact.

The light beam type sorting apparatus is arranged to sort by measuring the fruit without touching it. It is thus an advantage of this type that the fruit can be sorted without damaging it. On account of this, the sorting apparatus of this type is becoming most popular. However, in this type, the measuring points are limited to the travelling direction (or the longitudinal direction) of the fruit and the direction of width. This limitation necessitates an arrangement to convey the fruit in an upright posture. Therefore, as shown in FIG. 4, the skin of the fruits tend to be damaged by their stems as they tumble over headlong when discharged. It is another shortcoming of this type that the discharge point is fixed because backets are arranged to be tilted at a predetermined point for every sorting rank. The camera type sorting apparatus also has the same shortcomings.

Each of these shape sorting apparatuses is arranged solely for shape measurement with a measuring device paired with a conveyor which is generally called a bucket conveyor or a sorting conveyor and cannot be arranged in combination with other measuring devices. They show no concept of making them capable of measuring the weight as well as the shape of the objects to be sorted.

Meanwhile, the weight type sorting apparatuses have been improved year after year. These improvements include apparatuses which have been recently developed by utilizing electronic weighing instruments. The structural arrangement of the apparatuses of this type can be divided into two kinds. In one kind, the bucket (a weighing container) which is arranged to carry the fruit thereon is supported by Roberval mechanism forming a parallelogrammic linkage as a weighing mechanism (Japanese Utility Model Application Laid-Open No. Sho 53-148943; Japanese Patent Application Laid-Open Nos. Sho 57-8770 and Sho 57-12864). In the other kind, the fruit is weighed with the bucket of a simple cup shape supported by a balance (Japanese Utility Model Application Laid-Open No. Sho 52-159957). Meanwhile, the discharging methods adopted by these apparatuses include a method of discharging the fruit straight downward as shown in FIG. 5 and a method of discharging the fruit sideward.

In every one of these weight type sorting apparatuses, the weight of the fruit is measured with a sliding piece arranged either below or on one side of the bucket which travels over a weighing device. Therefore, to have the fruit positioned in the middle of the bucket, a deep bowl shaped receiving tray is employed. However, the deep bottom of the receiving tray requires the discharging operation to be done by tilting it to a great degree. Such a discharging operation tends to damage the fruit. Further, since sorting is effected through a classifying discharge device, it is a shortcoming that the discharge points are spaced at fixed intervals in the same manner as in the case of the light beam type shape sorting apparatuses. Further, the bucket and the weighing device are paired with each other for the single specific purpose and the bucket cannot be used in combination with a measuring device of a different type. There is seen no concept of arranging the apparatus to be capable of sorting both by shape and by weight.

In the meantime, intensified competition among producing areas has forced farmers either to change the kinds of their produce or to diversify the kinds. Hence, it is not economical to separately install a shape type sorting apparatus and a weight type sorting apparatus for the diversified kinds of produce. It is therefore desired to have a fruit sorting apparatus capable of sorting both by weight and by shape.

While some markets desire that shipments of fruits be sorted by shape, other markets desire to have shipments of the same fruits sorted by weight. Some areas of consumption prefer a high sugar content in produce while other areas prefer a sourish sweet taste for the same kind of produce. At present, however, there is no sorting apparatus that is capable of meeting such requirement.

Some fruit sorting facilities are installed for producing farmers located in sloping hillside areas while other facilities are installed for farmers located in flat land areas. Assuming that the same kind of produce or fruit is produced by those farmers located in such different kinds of areas, the height of the fruit produced in the hillside area differs from that of the fruit produced in the flat land area as shown in FIG. 6 even if they have the same circumference or girth. In case where sorting is carried out by shape, the farmers who produced the taller fruit in the hillside area are paid less for the amount of produce than the farmers of the flat land area because the same price applies to the same grade. In view of such unfairness, it is desired to use a fruit sorting apparatus which is capable of measuring the height of the fruit for fair pricing.

SUMMARY OF THE INVENTION

It is therefore an object of the present invention to provide a novel method and an apparatus for sorting fruits or vegetables which is capable of meeting the requirements of the producers, fruit sorting facilities and consumers by eliminating the above stated shortcoming of the prior art apparatuses.

In the method according to the present invention, a shallow bottomed tray conveyor which is arranged to float somewhat a little above conveyor chains and to be tiltable is used for conveying the object to be sorted. Various measuring units are arranged along a portion of the fruit sorting conveyor. An electronic weighing instrument which is provided with a sliding rail for enabling the lower surface of the above stated tray to slide therealong is arranged as an electronic weight measuring unit below the travelling path of the tray. Further, a planar shape measuring unit using a photosensor, such as a line-sensor camera and the like is arranged above the tray conveyor path to face downward. The photosensor receives light reflected from the object or fruit to be sorted on the tray to measure the length and width of the fruit as a length and width measuring, planar-shape measuring unit by detecting the size of the planar shape of the fruit (including the length in the traveling direction and the width in the transverse direction perpendicular to the travelling direction). Another photosensor is arranged close to the downward facing planar shape measuring unit on one side of the tray conveyor path and perpendicularly thereto to detect the height of the fruit on the tray as a height measuring, side-shape measuring unit. In addition to these various kinds of measuring instruments such as an internal quality analyzer and color and flaw detectors, etc. are arranged close to these sensors to form a measuring section for grading and ranking purposes.

A portion of the conveyor path from the measuring section to the end of the conveyor is allocated to a fruit distribution section. The fruit distribution section includes discharge operation units which are spaced at short intervals and are arranged to tilt the tray for sorting by grade and by rank. The number of the discharge operation units is greater than the number of sorting classes with two or more of the discharge operation units allocated to each class of a higher sorting frequency. The fruit sorting conveyor is provided with receiving bins which are arranged for the sorting classes to have the fruits dispersively distributed to them. The invented arrangement is such that some kinds of produce can be sorted by weight while other kinds can be sorted by shape in accordance with difference in destinations or that the produce can be sorted both by weight and by shape in a combined manner, so that, for example, a shipment sorted by shape can be paid by weight. Thus, in accordance with the present invention, the single fruit sorting apparatus permits sorting in any manner as desired.

Further, the color and flaws to be used in determining the grade can be measured by means of a discriminating device which is capable of discriminating flaws and a coloring degree using a known television camera in combination with an image analyzing process. The degree of sugar content, and the degree of sourness and of ripeness also can be detected with a device using a known internal quality analyzer arranged in the measuring section to determine the degree of ripeness by measuring chlorophyll contained in the fruit and by measuring difference in optical density (difference in absorbance). These known measuring processes are still insufficient for grading. Therefore, the appearance of the top portion of the fruit is inspected with a combination of a television camera and an image analyzer which are also arranged in the measuring section to determine the fatness of the top portion of the fruit, the size of the trace of flower, the degree of opening of the calyx in the flower trade part in the case of an apple, etc. for the purpose of grading the fruit. The results of inspection by these different measuring devices obtained for determining an applicable grade are supplied to a computing device. Then, the fruits are classified into different grades including "excellent", "very good", "good", "fair", etc. through the combination of these results supplied to the computing device.

The above and further objects and features of the invention will become apparent from the following detailed description of a preferred embodiment thereof taken in conjunction with the accompanying drawings.

BRIEF DESCRIPTION OF THE DRAWINGS

FIG. 8 is a side view of the embodiment shown in FIG. 7;

FIG. 10 is an illustration of the side shape measuring unit of the embodiment;

FIG. 11 is a side view showing the tray device to be used in combination with the measuring unit shown in FIG. 10;

DETAILED DESCRIPTION OF THE PREFERRED EMBODIMENT

Figure 1:
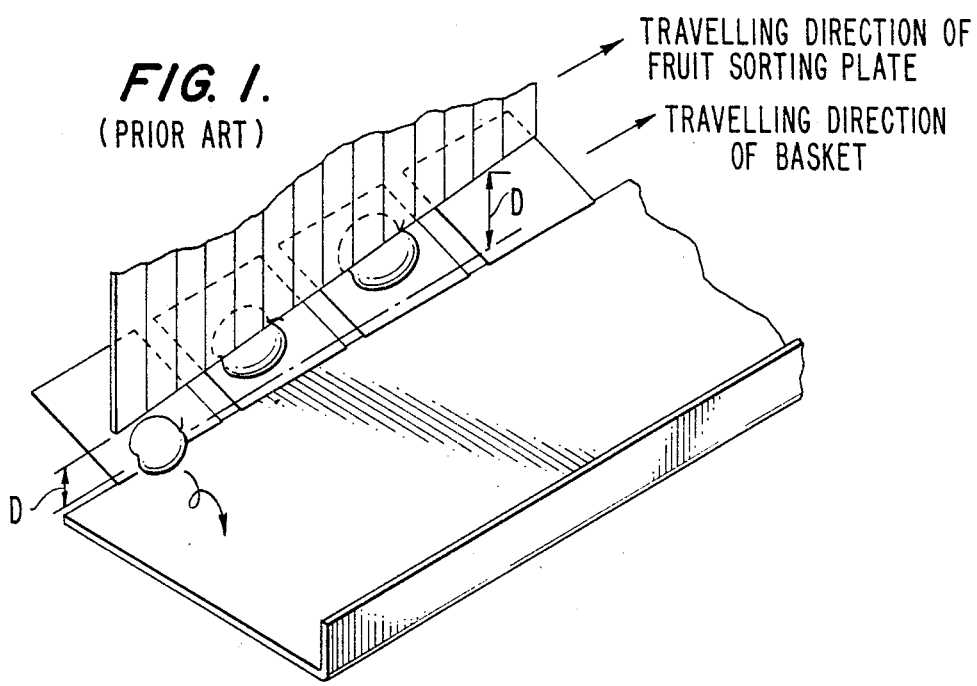
FIG. 1 is a perspective view showing a prior art contact type apparatus arranged to measure a distance between two points.
Figure 2:
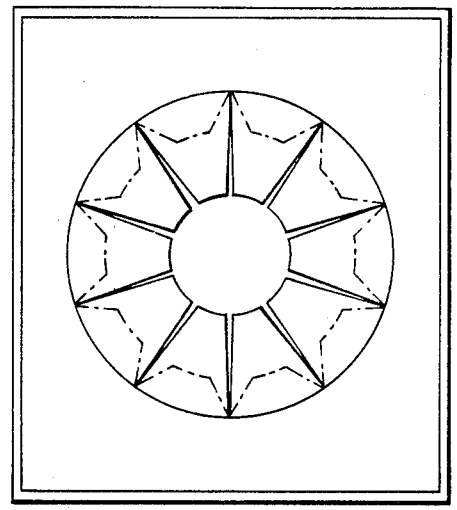
FIG. 2 is a plan view showing a whole circumference contact, umbrella type prior art apparatus.
Figure 3:
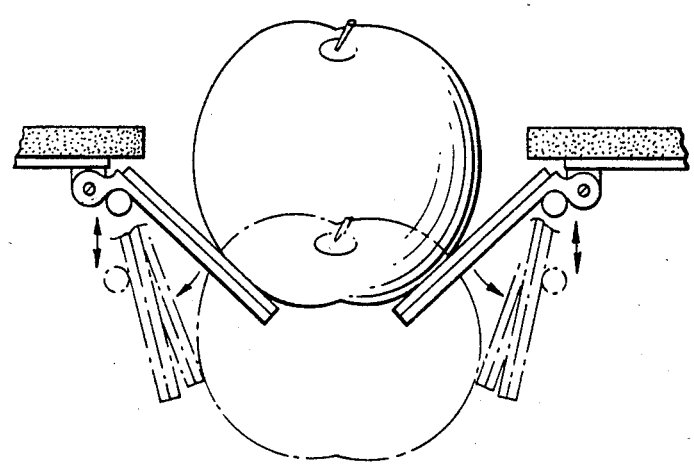
FIG. 3 is a sectional side view showing the arrangement of the apparatus shown in FIG. 2.
Figure 4:
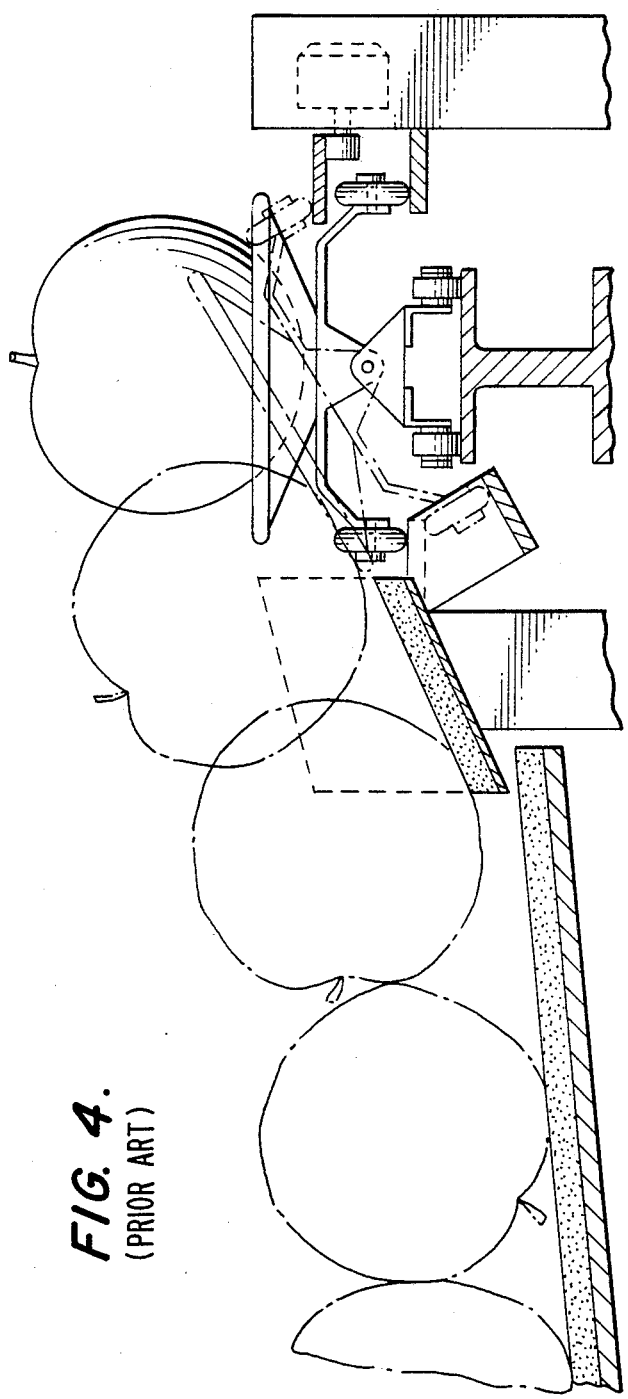
FIG. 4 is a sectional side view showing the operation of the discharge part of a prior art light beam type sorting apparatus.
Figure 5:
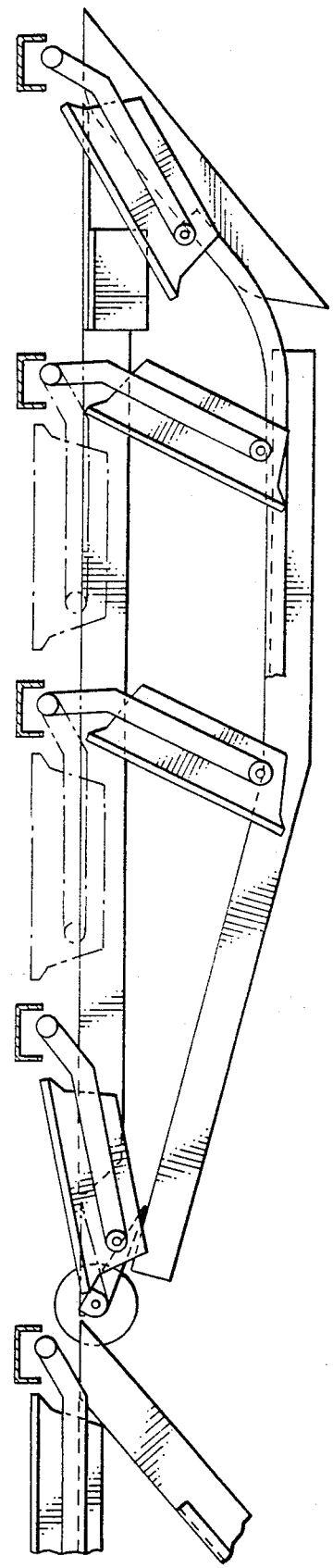
FIG. 5 is a side view showing the operation of a conventional downward discharge device.
Figure 6:
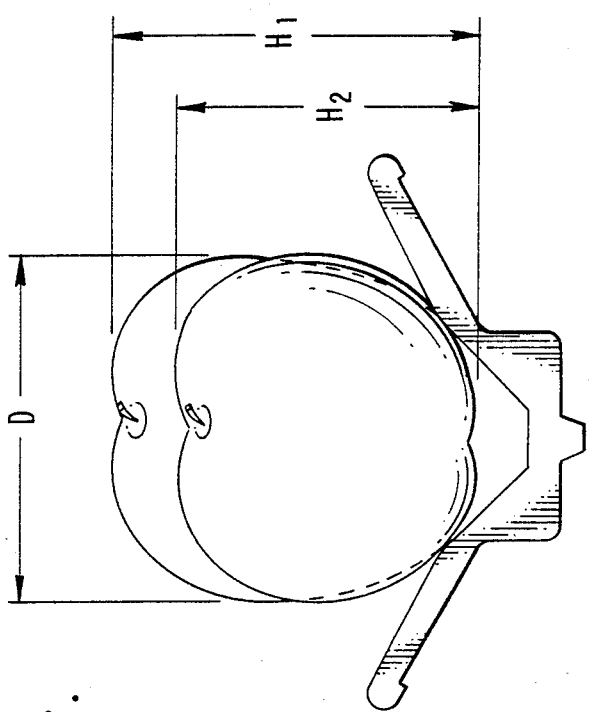
FIG. 6 is a diagrammatic view showing two fruits which differ in height although they are of the same diameter.
Figure 7:
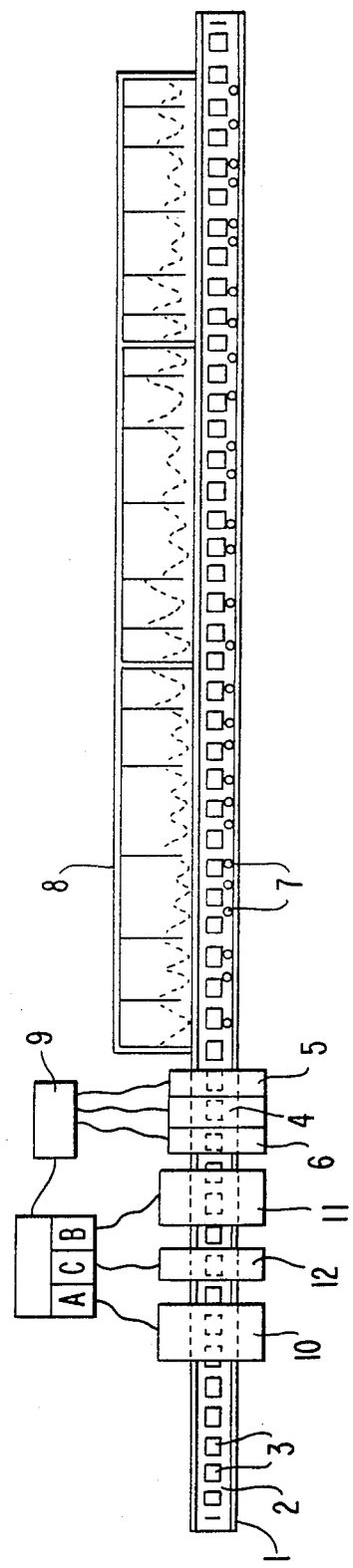
FIG. 7 is a plan view of a first embodiment of the present invention.
Figure 21:
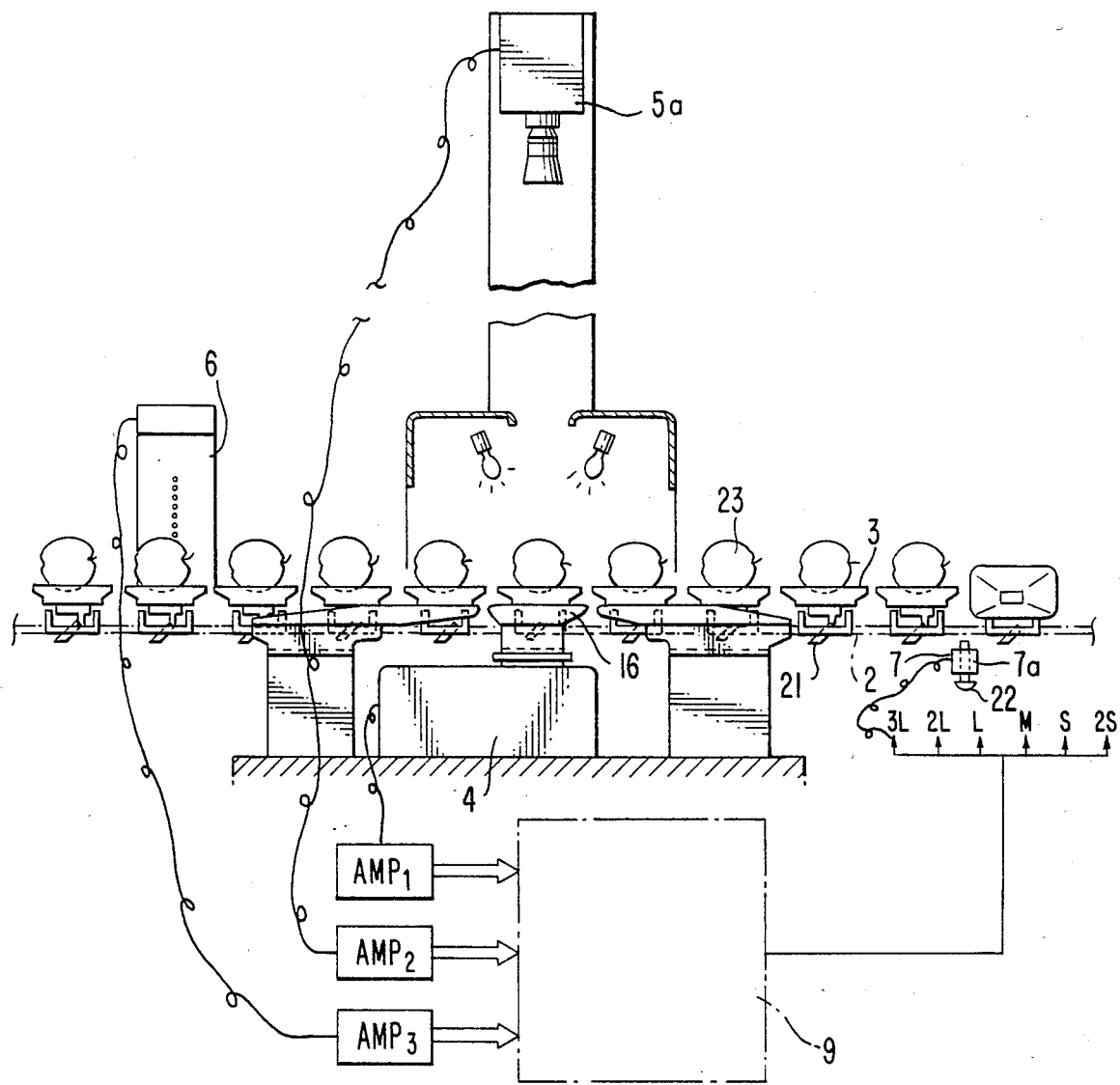
FIG. 21 is a diagrammatic view of a planar-shape measuring unit, an electronic weighing unit and a side-shape measuring unit arranged in combination.

Referring to FIGS. 7 etc., an embodiment of the invention comprises a fruit sorting conveyor 1; a conveyor chain or chains 2; and a plurality of tray devices 3. The tray device 3 can have various shapes. The number of conveyor chains 2 varies with the shape of the tray device 3. One conveyor chain 2 may be disposed on each of the left and right sides or one or two chains may be arranged in the lower middle part of the conveyor 1 according to the shape of the tray device 3. An electronic weighing unit 4 is arranged below the travelling path of the tray device 3 to receive the lower surface of the device 3 for measuring the weight of an object or fruit to be sorted. As the electronic weighing unit, a force-ballance type, a load-cell type, etc. may be used. Weighing of fruits to be sorted by the electronic weighing unit 4 will be done in the following manner. When the lower sliding face 15 of the tray device body 13 moves on the slidable measuring rail 16 of the electronic weighing unit 4 as shown in FIGS. 10, 14, 15, 17 and 21, and the signal generated based on the weight thereof is amplified by the amplifier AMP1 and supplied to computer 9. A planar-shape measuring unit 5, preferably a line-sensor camera 5a (see FIG. 21), is arranged above the travelling path of the tray device to face downward in such a way as to have the upper surface of the tray device within the visual field thereof. The unit 5 may be positioned at the same place as the unit 4 as shown in FIG. 21. Measuring of a width and a length of fruits to be sorted by the line-sensor camera 5a (linear sensor camera) of the planar shape measuring unit 5 will be done in the following manner.

When the tray device body 13 reaches a field of view of the line sensor camera (linear sensor camera) 5a as shown in FIG. 21, the line sensor camera (linear sensor camera) 5a starts a scanning. The scanning will be repeatedly done until the tray device body completely passes through the above-mentioned field of view of the camera 5a.

The video signal caught by the scanning with the camera 5a is amplified by the amplifier AMP2 then is supplied to computer 9. A side shape measuring unit 6 is arranged on one side of the travelling path of the tray device to have within its visual field, the surface of the tray device 3 which is perpendicular to the conveying rail-way of the conveyor. The measuring of a height of a fruit to be sorted by the side shape measuring unit 6 will be done in the following manner.

When the tray device body 13 reaches a vertical light ray plane formed by the horizontal ray of light of the side shape measuring unit 6 in a direction crossing the conveyor 1 as shown in FIG. 10, the vertical light ray plane starts a scanning. The scanning will be repeatedly done until the tray device body completely passes through the light ray plane. The signal from the unit 6 is amplified by the amplifier AMP3 and is supplied to computer 9. Discharge operation devices 7 are arranged to tilt the tray device 3 at prescribed points. The discharge operation devices 7 have solenoid coils 7a driving a core piece 22, as shown in FIG. 21, and are positioned underneath a travel path of the tray device 3 and operate in the manner described below.

They are operated by the discharge signals supplied to the discharge devices 7 provided at the designated positions which correspond to the classes determined in the computer 9, and the piece 22 contacts the disengaging lever 21 protruding from the lower part of the tray device body 13 for releasing the engagement of the engaging mechanism 20 of the tray device 3, and the tray 19 will then be tilted.

The fruit distributing bins 8 are positioned along the side of the travel path of the sorting conveyor 1 from a point passing through a measuring part to the terminal end of the conveyor, as shown in FIG. 7, and are divided into spaces necessary for housing the fruits sorted according to respective classes.

Figure 9:
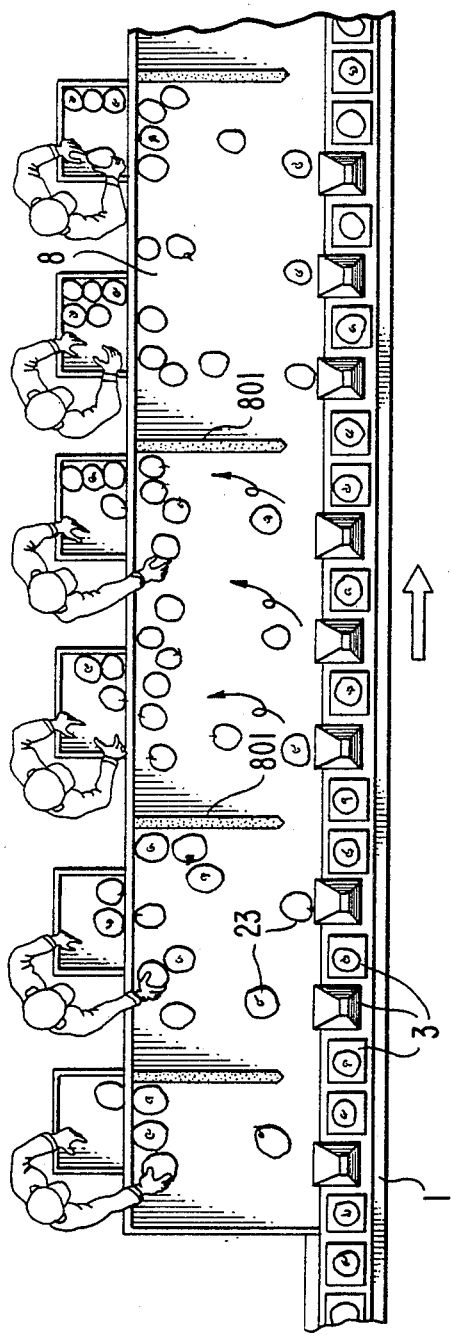
FIG. 9 is a plan view showing the fruit distributing box of the embodiment of FIG. 7.
Figure 9A:
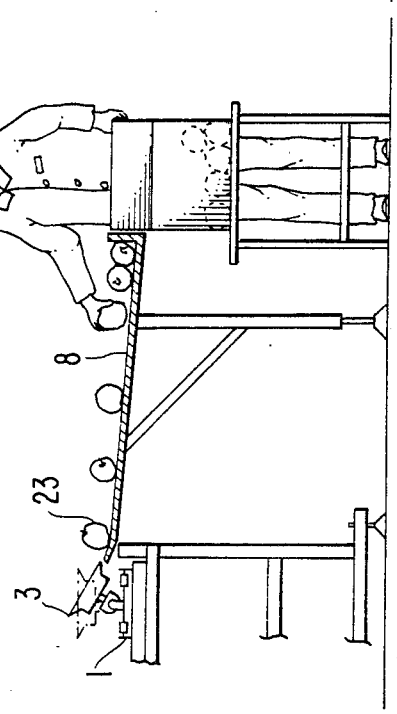
FIG. 9a is a sectional elevation view of the box of FIG. 9.
Figure 12:
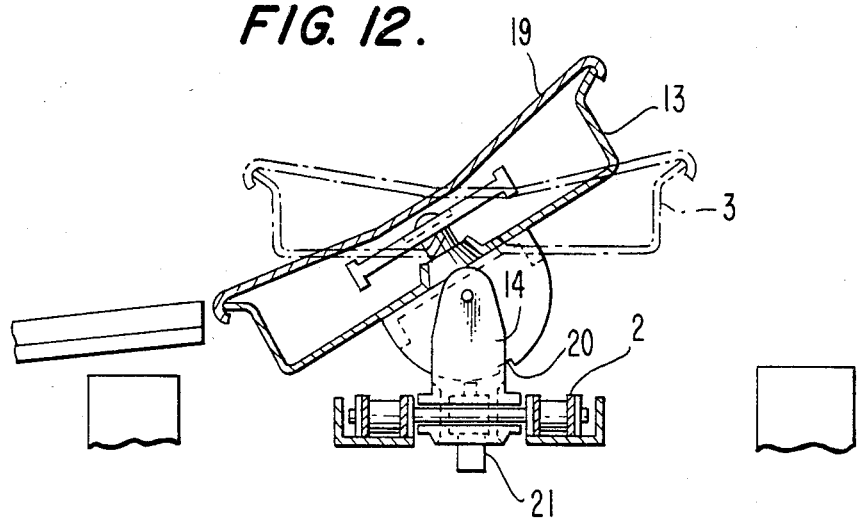
FIGS. 12 and 13 are elevation views showing the operation of the discharge operation part of the tray device shown in FIG. 11.
Figure 13:
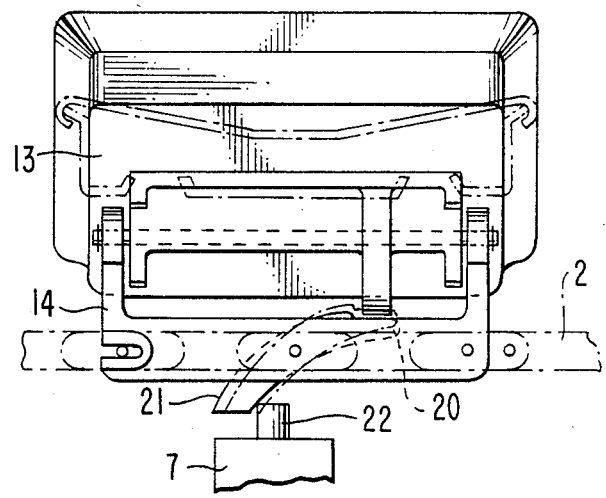
Figure 14:
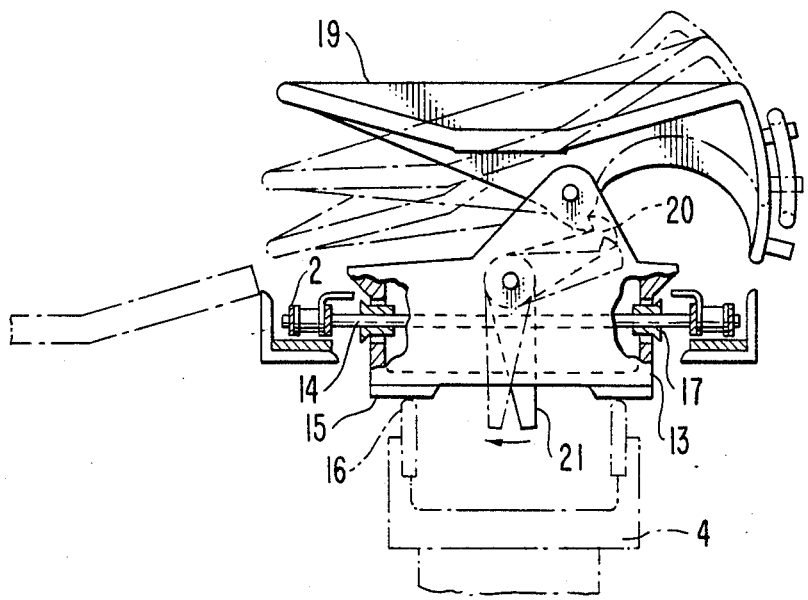
FIG. 14 is an elevation view of another example of the arrangement of the tray device.
Figure 15:
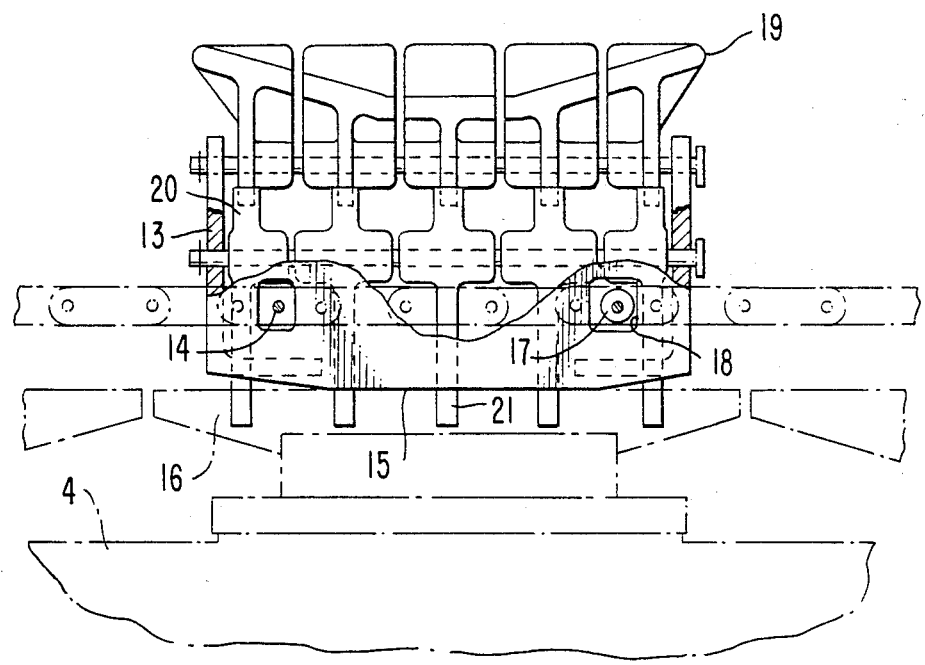
FIGS. 15 and 16 are elevation views of a further example of the tray device which is divided into a plurality of trays, these divided trays being shown as being tilted one after another.
Figure 16:
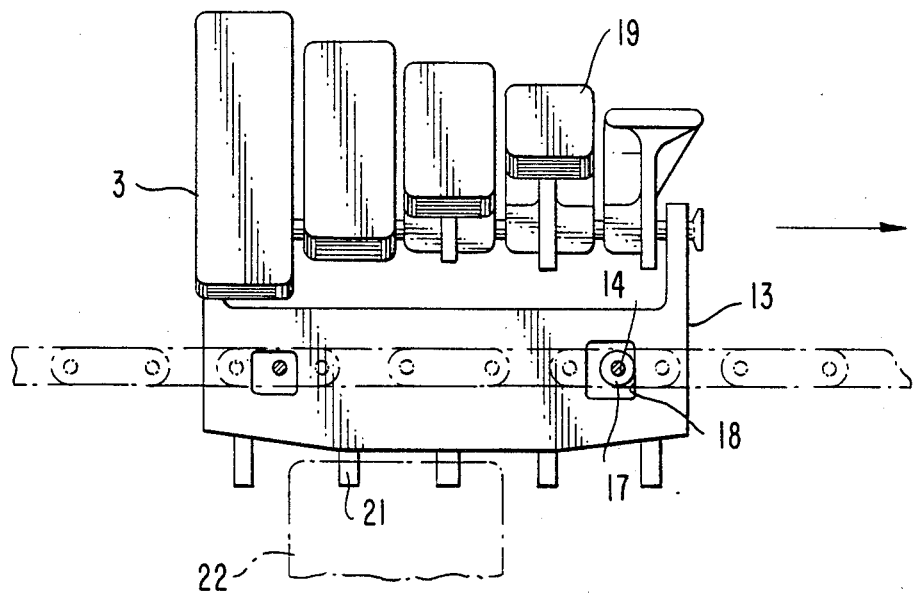
Figure 17:
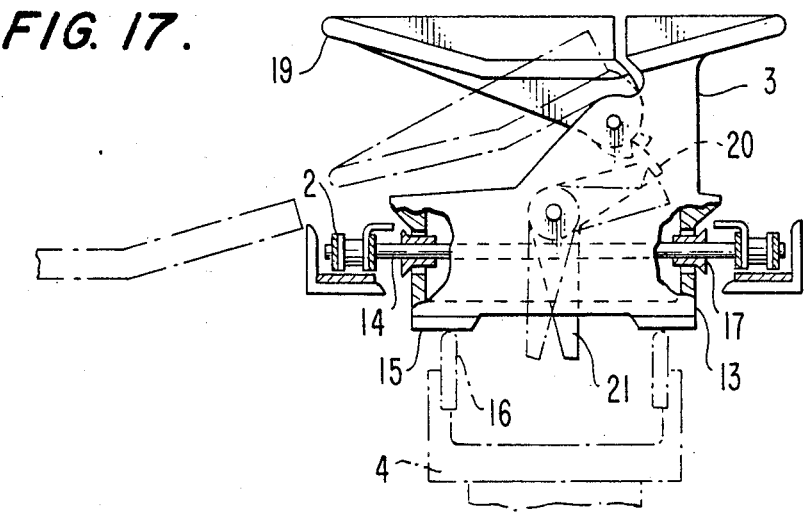
FIG. 17 is an elevation view of another example of the tray device in which the discharge side thereof is divided.
Figure 18:
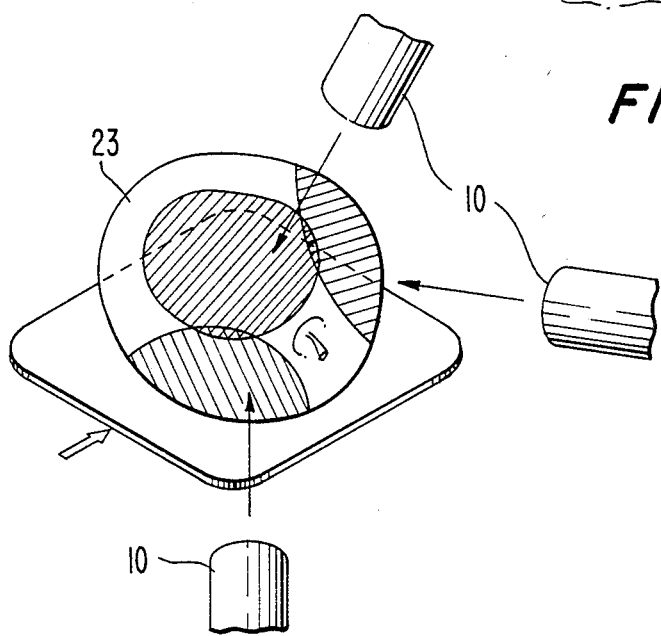
FIG. 18 is a perspective diagrammatic view of a color and flaw measuring arrangement of the embodiment.
Figure 19:
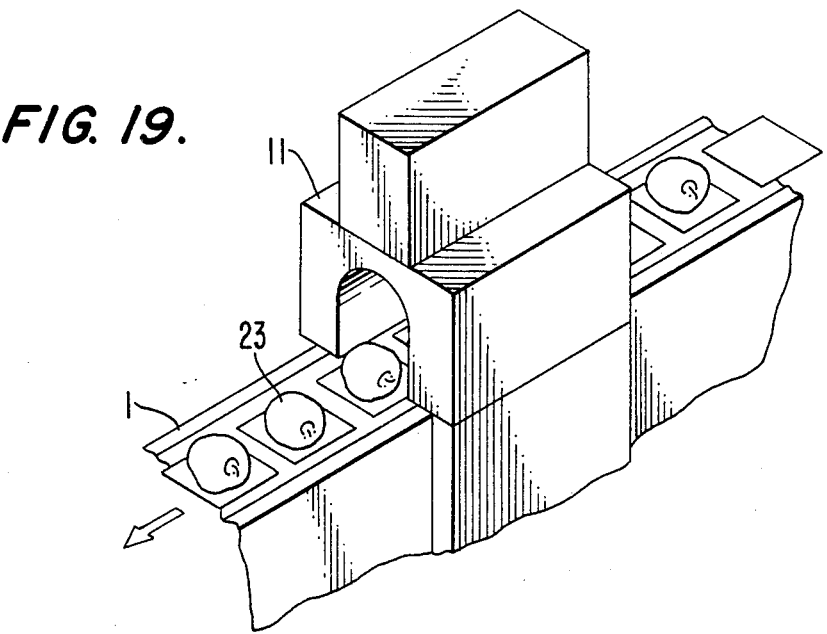
FIG. 19 is a perspective view showing an internal quality analyzer mounting arrangement.
Figure 20:
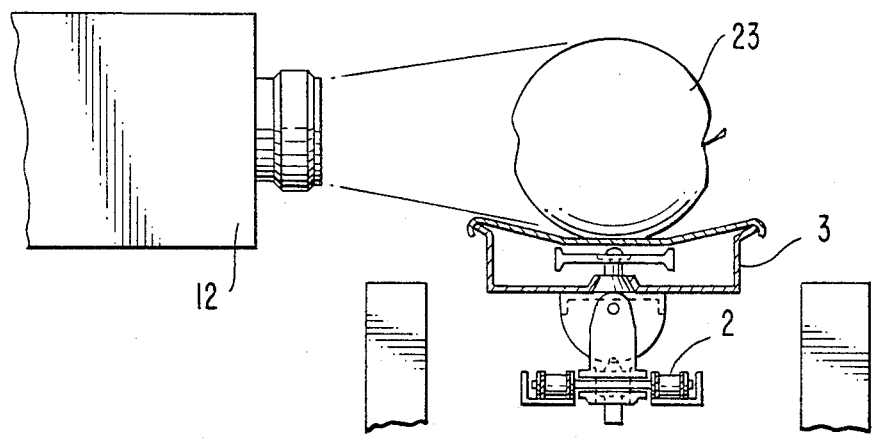
FIG. 20 is an elevation view of the inspection of the top portion of a fruit.

The fruit distributing bins 8 are packing tables for housing and packaging the fruit 23 which has been discharged from the tray devices 3 as shown in FIGS. 9 and 9a, and the table planes thereof are made of plates moderately tilting downwards and have their three sides covered with side boards of a height corresponding to a size of fruits. At 801 is a dividing board and is provided at a boundary of the classes in such manner that the class into which greater number of fruits are to be sorted will have a larger space.

A discharge device or devices 7 is positioned at each fruit distributing bins 8 for each class. A plurality of discharge devices 7 are allotted to the class into which greater number of fruits are sorted. Thus, a larger number of the discharge devices 7 than a number of classes into which the sorting is made will be provided in the above-described arrangement.

Therefore, the classes into which a greater number of pieces of fruit are sorted having a plurality of discharge devices 7 in a plurality of positions in the large space of the fruit distributing bins 8 and the fruits 23 are discharged in a dispersed manner, so that there will be no fruits 23 overflowing in any specific class.

The embodiment includes a computing device 9 which is provided with a presetting circuit for presetting weight classifying values and shape classifying values. The computing device 9 compares a weight signal from the electronic weighing unit and a shape signal from the shape measuring unit with reference values respectively to detect an applicable class and shifts a discharge signal from one discharge operation device to an applicable discharge operation device in synchronism with the tray conveyor. The computing device 9 has the following arrangement for judging classes and/or grades of fruits to be sorted.

The computing device 9 has within itself a known microprocessor unit (MPU).

Figure 22:
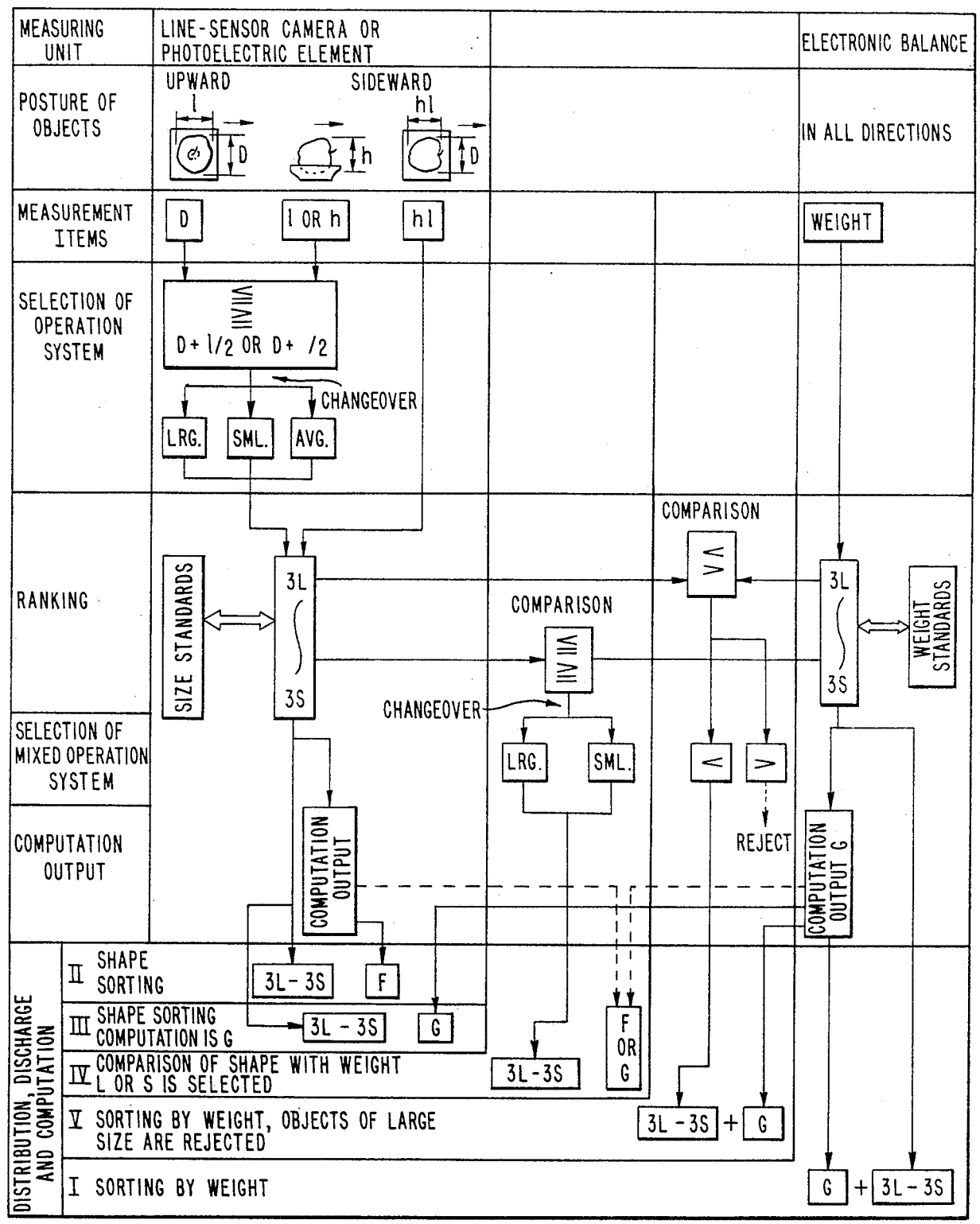
FIG. 22 is a flow-chart of a sorting system according to the present invention.
Figure 23:
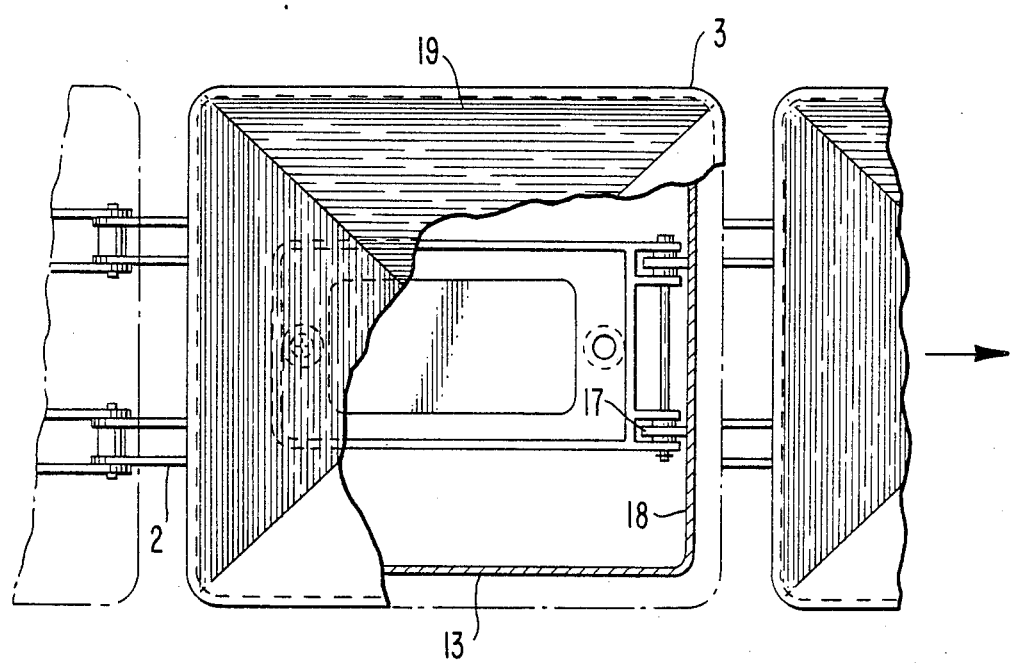
FIG. 23 is a plan view of the tray device shown in FIG. 11.
Figure 24:
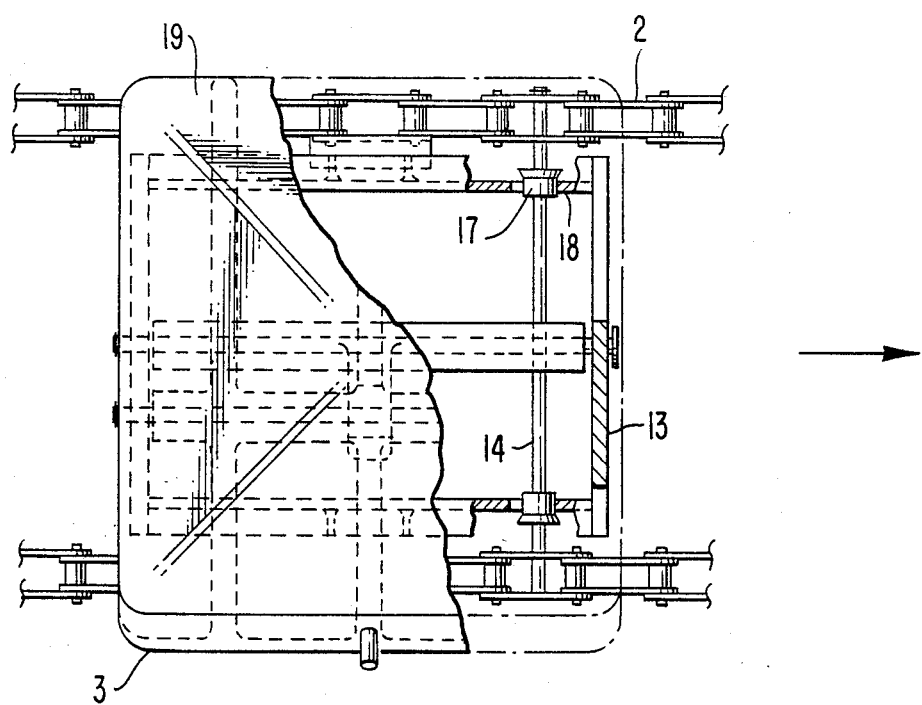
FIG. 24 is a plan view of the tray device shown in FIG. 14.
Figure 25:
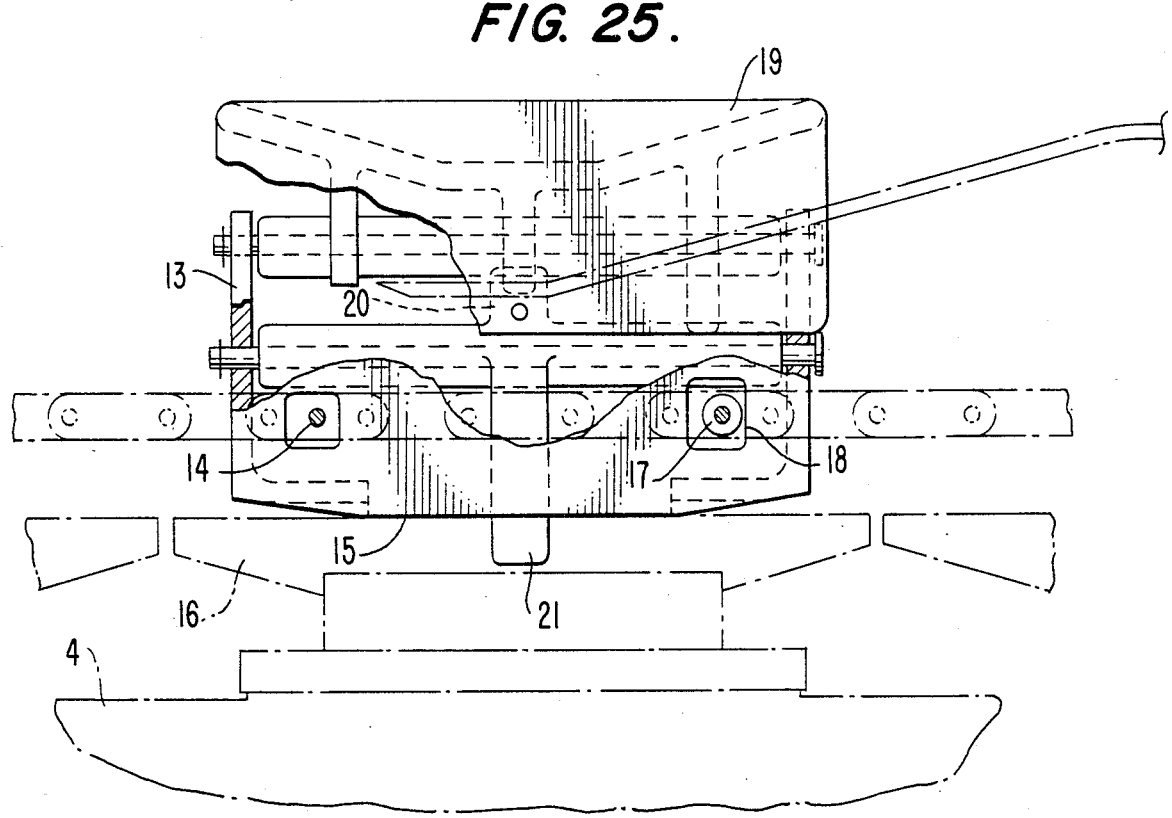
FIG. 25 is a side view of the tray device shown in FIG. 14.
Figure 26:
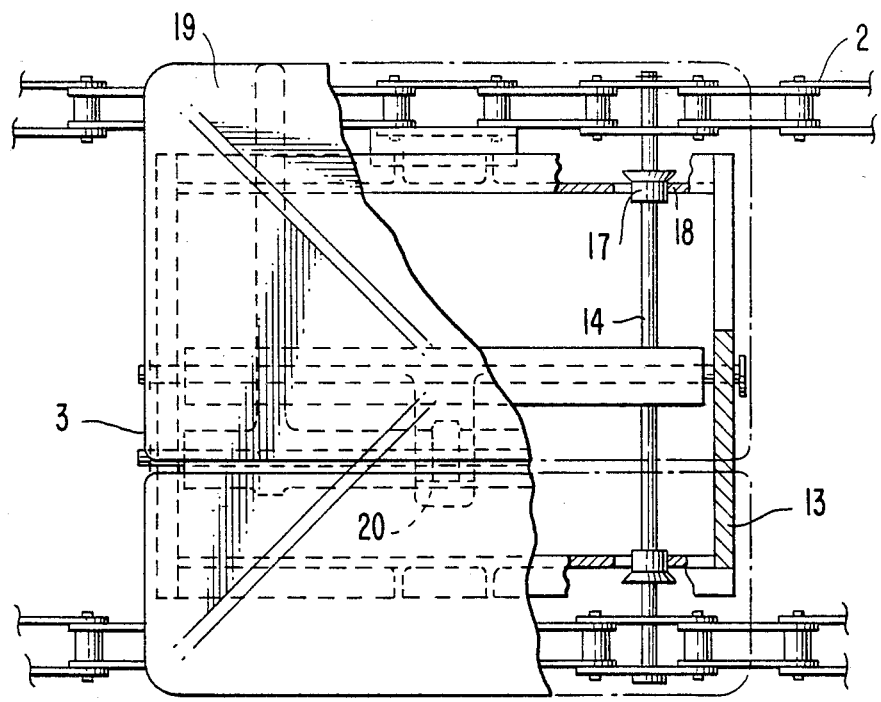
FIG. 26 is a plan view of the tray device shown in FIG. 17.
Figure 27:
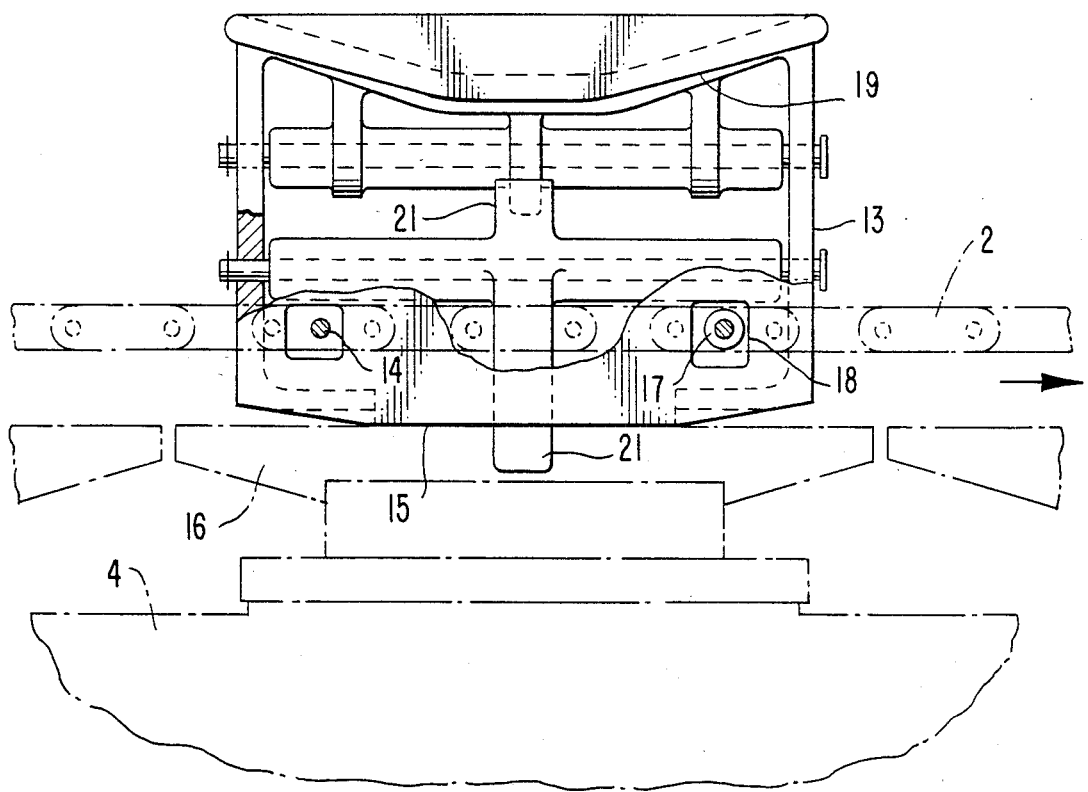
FIG. 27 is a side view of the tray device shown in FIG. 17.

The computing device selects the output from one or more of the measuring systems, that is the electronic scale, the line sensor camera and a photo-electric element, as shown in uppermost section in the flow chart in FIG. 22.

In a case when a fruit is placed on the tray in an upright posture:
one of three values is obtained, that is, an outer diameter (D) in the width direction and an outer diameter (l) in the lengthwise direction are compared and the larger one thereof will be used as a measured value; or the smaller one thereof will be used as a measured value; or an average value obtained by adding these two measured values and dividing the same by two, and this is used as a measured value.

In a case when a fruit is placed on the tray in a sideway posture:
one of three values is obtained, that is an outer diameter (h) in the height direction and an outer diameter (D) in the width direction as viewed from above are compared and the larger one thereof is used as a measured value; or the smaller one thereof is used as a measured value; or an average value is obtained by adding these two values and dividing the same by two and is used as a measured value.

When the electronic scale is used, a weight value will be obtained by the measuring.

The respective values obtained are compared with standard values for various classes and ranked from a size 3L to a size 3S, and these in turn are compared with a minimum and where the rank is lower, the computer produces a rejection signal F or G. Appropriate signals are produced for the values for the remaining objects, i.e. those not rejected, and these are combined in various ways depending on how the fruit is to be classified. For example, it can be sorted just by weight, i.e. category I at the bottom of FIG. 22, or it can be classified by weight and shape, as in category III. Appropriate output signals are produced for supply to the discharge operation devices 7 for discharging the article into the proper bin. Further, the computing device 9 may be also arranged to perform a data processing operation for counting the number of pieces of the fruit sorted for each of the grades and ranks. Meanwhile, a television camera is provided as a color and flaw inspecting device 10. An internal quality analyzer 11 is arranged to measure the sugar content and the degree of sourness of the fruit. An appearance inspection device 12 is provided to examine the appearance of the top portion of the fruit.

The provision or non-provision of the color and flaw inspecting device 10, the internal quality analyzer 11 and the appearance inspecting device 12 is not essential for the purpose of the present invention and may be provided if desired.

More specifically stated, the body 13 of the tray device 3 is not fixedly attached to the mount members 14 of the conveyor chain 2 but is loosely mounted thereon to be somewhat movable up and down, back and forth and left and right in a floating manner. When the lower sliding face 15 of the body 13 travels over a slidable measuring rail 16 of the electronic weighing unit 4 which serves as a weighing base of the unit 4, the tray device body 13 is brought into a somewhat uplifted state. Under that condition, the tray device body 13 has a vertical side face 18 thereof pushed forward by pushing rollers 17 which are rotatably mounted on a shaft, so that a vertically imposed load can be accurately measured by the electronic weighing unit.

Referring to FIGS. 10, 11, 12 and 13, the tray device 3 has a tray 19 mounted on the body 13. The body 13 is caused to keep its horizontal posture by itself by virtue of the engaging mechanism 20 of the tiltably arranged mount member 14. A disengaging lever 21 is provided on a part of the mount member 14 to cause the tray 19 to be tilted together with the body 13 in such a way as to allow the fruit 23 to gently roll sidewise to the outside when the operating piece 22 of the discharge operating device 7 comes in contact with the disengaging lever 21. This is one example of arrangement of the tray device 3. Another example of arrangement of the tray device is as shown in FIGS. 14, 15, 16 and 17.

In the case of the arrangement shown in FIGS. 14, 15, 16 and 17, the tray 19 is mounted on the body 13 to be tiltable relative to the body 13. The body 13 is proivded with an engaging mechanism 20 and the body 13 is not tiltable. With this arrangement, the tray 19 in this instance can be divided into a plurality of trays. Besides, the mount member 14 can be simply arranged in this instance.

Unlike the trays of the conventional weight type sorting apparatus, the tray 19 according to the present invention has its upper surface optically arranged to absorb light and not reflect it so that the fruit can be clearly distinguished from the upper surface of the tray. It is another feature of the tray device that the tray has a shallow dish like shape to permit observation of the appearance of the fruit 23 to be sorted both from above and from a side point.

The tray device 3 is arranged either to have one tray 19 for one body 13 or to have a plurality of divided trays for each body 13 with each of the divided trays paired with one of the same number of engaging mechanisms 20. In the case of the divided trays, the pieces of fruit on these divided trays are discharged by tilting the trays one by one starting with the foremost one, so that the fruit can be gently discharged without applying any urging force thereto.

The upper surface of the tray may be covered with a soft elastic material which is finished into an artificial grass like state with upstanding fluff provided for a stable seating condition of the fruit and for preventing it from being damaged. The soft elastic material also may be formed into an air cushion-like state to attain the same effects.

At the fruit distribution section, the tray 19 of the tray device 3 which is constructed in the above described manner can be tilted by just bringing the operating piece 22 momentarily into contact with the disengaging lever 21. The fruit, therefore, can be discharged without difficulty. In the conventional apparatuses, the backet is arranged to be tilted along a cam or a guide by shifting, with the guide or cam, the travelling direction of a lever or pin or a roller protruding from the bottom or from one side of the backet. The conventional arrangement, therefore, tends to have trouble with the discharge operation part. The invented arrangement eliminates the possibility of such troubles. Further, since the tilting operation can be instantly carried out by one touch as mentioned above, the speed of the conveyor can be increased for improvement in capacity of the apparatus.

Next, the color and flaw inspection device 10 of the grade measuring part is provided with at least two cameras which are arranged as sensors to see the fruit from at least two different directions. The degree of color of the fruit is compared with the grade classifying values memorized in the memory of a grade computing device A to detect thereby an applicable color grade. As for the flaw, the same sensors detect any color portion (discolored part) that differs from the intrinsic skin color of the fruit and the size of the discolored portion is compared with the grade classifying values to determine an applicable grade in terms of flaw.

The sizes of flaws either may be classified into different grades or may be subjected to degrading according to the kind of the fruit to be sorted.

The degree of ripeness involving sweetness and sourness is measured with the internal quality analyzer 11. The value $\Delta OD$ of optical density difference (difference in absorbance required) which indicates the ripeness of each kind of fruit is compared with the grade classification values preset in a grade computing device B to determine an applicable grade of ripeness.

The manner in which the appearance inspection is carried out varies with the kind of the fruit to be sorted. In the case of apples, however, the appearance inspection is carried out by observing the flower trade remaining in the top portion of the fruit. Grading model patterns are preset and stored in the memory of a grade computing device C for comparison with the results of observation. An apple having an open and split calyx ring at its flower trade part is judged to be sweet with honey contained therein while an apple having a closed and shrunk calyx ring is judged to be not sweet and to be astringent. An applicable grade of the apple is thus determined through such comparison.

As regards peaches, the peduncle side of the peach is inspected instead of the top portion. The grading model patterns are preset at the memory in such a manner that: A peach having a hole in the recess of the peduncle is judged to be of the lowest grade because of a cracked core. A peach having symmetrical roundness on both sides of its sutura line is judged to be of a higher grade while the one having asymmetrical roundness is judged to be of a lower grade. An applicable grade is determined by comparing the results of inspection with the model patterns in the same manner as in the case of apples.

The grade signals representing the results of the various items of inspection are input into the computing device 9, where the results are integrated to determine the grade of the fruit on the basis of the lowest grade.

An example of the above described grading inspection is as shown in the table.

The fruit or vegetable to be sorted is placed on the tray of the sorting conveyor by the worker in a predetermined posture with respect to the tray depending on the selection of the measuring unit and the inspection device. The position of the fruit or vegetable placed on the tray is not changed until it is discharged into the appropriate fruit distributing bin.

In accordance with this invention, as has been described in the foregoing, each of the fruit carrying devices having trays on the fruit sorting conveyor is arranged to have its body somewhat movable back and forth, up and down and to the left and right relative to the conveyor chains. The shallow bottomed tray which is tiltable sidewise is mounted on the upper part of the tray device body. With the shallow bottomed tray, it is possible to observe the fruit or vegetable from above or from the side to inspect the shape, color, flaws, internal quality and appearance as well as the weight. The tray device is provided with an engaging mechanism which is arranged to keep the tray in a horizontal posture. The tray device is such that the tray is tiltable by merely touching a disengaging lever. An electronic weighing unit is provided for measuring the weight of the fruit.

At the same time, the width and length of the planar shape of the fruit and the height thereof are measured by a shape measuring unit. The conventional arrangement of sorting facilities has necessitated discrete provision of a shape sorting apparatus and a weight sorting apparatus according to the kinds of fruits to be sorted.

sorting apparatus can be effectively operated to its full capacity with the object put on the tray without fail. The productivity of the conventional apparatuses which is considered to be 50 to 60%, therefore can be greatly increased by the use of the invented method and apparatus.

| Item | Grading | Excellent | Very good | Good | Fair |
|---|---|---|---|---|---|
| Color | By color of ripeness | ☐☐ % and above | ☐☐ % and above | ☐☐ % and above | ☐☐ % and above |
| Flaw | By size of discolored part | 0. | ☐☐ mm² and above | ☐☐☐ mm² and above | ☐☐☐☐ mm² and above |
| IQ | By difference in absorbance value   ΔOD   ΔOD | ☐☐☐/☐☐☐ | ☐☐☐/☐☐☐ | ☐☐☐/☐☐☐ | ☐☐☐/☐☐☐ |
| Appearance | The shape and fatness of the flower trace part and the opened degree of calyx ring part are image processed and compared with grading models stored in the memory. | An object agreeing with a plurality of the models representative of "excellent". | An object agreeing with a plurality of the models representative of "very good". | An object agreeing with a plurality of the models representative of "good". | Any object that fails to agree with any of the models representing "excellent", "very good" and "good". |

The lowest of the results of inspection obtained for the above-indicated items of inspection is considered to be the grade applicable to the object to be sorted.

On the other hand, according to the present invention, it is possible to perform the shape sorting and weight sorting of various kinds of fruit and vegetable by a single sorting device (a single sorting conveyor including a computing device). Therefore, sorting facilities can be efficiently operated with a great economical advantage.

Since the discharge device is arranged to be operatable by just touching it, many units of the discharge device can be arranged within a short distance corresponding to one tray device. Therefore, a distribution part having a small distribution quantity can be arranged narrower while a part having a large distribution quantity can be arranged to have many pieces of fruit successively discharged within a short span. This advantage not only permits elimination of unnecessary spaces but also permits to effectively avoiding congestion in the area of discharge to prevent fruits from being damaged.

Further, according to the present invention, the inspection devices for inspecting the color, flaw, internal quality and appearance to determine the grade are arranged closely in front of the measuring unit for measuring the weight, planar shape and side shape. The signals representing inspection results by these inspection devices are supplied to the computer to determine the grade of the fruit and the signals representing the grades of fruit determined by the various measuring units are combined and classified, and the discharging device is actuated by the discharging signal on the basis of the classification to automatically perform the sorting. The automatic sorting not only contributes to labor saving but also eliminates the inconsistency of quality classification to ensure a favorable reputation in the market. The invention therefore gives a great economic advantage to the producers.

Further, the automatic sorting by grade enables the producer to set quality standards to meet the specific requirement of each specific market.

Since the grading and measurement is accomplished while the object to be sorted is on the tray device, the

What we claim:

1. A method for sorting objects, such as fruits and vegetables, of various shapes, such as spheroid shape, spherical massive shape, non-spherical massive shape and amorphous shape, which method comprises:
    conveying the objects to be sorted one by one and positioned in a fixed posture on a tray device of a conveyor, which tray device has a shallow depth, and is freely tiltable sideways;
    during transport of the object on the tray device, measuring the weight of the object on the tray device, measuring the planar shape and size from above and measuring the side shape and size and inputting the respective measurement signals into a computing device;
    comparing the results of the measurements with respective predetermined values for the weight and shapes and sizes and ranking the objects into one of a plurality of classes of the objects by means of the computing device and producing a discharge signal for each object according to its class;
    providing a plurality of discharge operation devices larger than the number of classes of the objects for tilting the tray devices for discharging the objects at intervals along the conveyor, and providing receiving bins along the conveyor corresponding to the classes of the object, the receiving bins for classes expected to have a larger number of objects classified thereinto being larger, and a plurality of discharge operation devices being provided for the larger conveyor bins, and operating the discharge operation devices corresponding to the receiving bin for the class of each object when the object passes such bin for discharging the object into the bin corresponding to the class of the object.

2. A method as claimed in claim 1 wherein the objects to be sorted are pieces of fruit, and the pieces of fruit are positioned on their sides on the tray devices, and the measurements of the planar shape and the side shape are compared with the predetermined values therefor for determining the class of the piece of fruit.

3. A method as claimed in claim 2 in which the shape of the piece of fruit and the weight thereof are compared with each other and when the shape is found to be larger than a predetermined value in comparison with the weight, discharging the piece of fruit from the tray device into a bin for rejected pieces of fruit.

4. A method as claimed in claim 1 in which the shape of the piece of fruit and the weight thereof are compared with each other and when the shape is found to be larger than a predetermined value in comparison with the weight, discharging the piece of fruit from the tray device into a bin for rejected pieces of fruit.

5. A method as claimed in claim 1 further comprising, during the transport of the object on the tray devices, inspecting the internal quality of the object on a tray device by non-contact inspection, comparing the results of the inspection with predetermined standards for producing grade signals corresponding to the grades of the respective objects, and supplying the grade signals to the computing device for use in producing a discharge signal for each object according to its grade and class.

6. An apparatus for sorting objects, such as fruits and vegetables of various shapes, such as spheroid shape, spherical massive shape, non-spherical massive shape and amorphous shape, which apparatus comprises:
a conveyor chain means;
a plurality of mounting members on said conveyor chain means spaced from each other at fixed intervals;
a tray device loosely mounted on each of said mounting members for movement up and down, back and forth and right and left relative to said mounting devices, said tray devices each having at least one tray for supporting an object and having a shallow bottom, said tray being mounted on said mounting device for sideways tilting relative to the direction of conveyor chain means travel, and further having an engaging mechanism holding the tray in a horizontal position, said engaging mechanism having a releasing lever projecting from under the tray device;
a plurality of measuring units along said conveyor chain means and being an electronic weighing unit for weighing the object supported on a tray, a planar shape measuring unit for measuring the shape and size of the object from above, and a side shape measuring unit for measuring the shape and size of the object from the side, said units producing output signals correspondingly to the measurements;
a computing device connected to said measuring units for comparing the measurements from said measuring units with predetermined values for ranking the object into classes as to its weight, as to its planar shape and size, as to its side shape and size, and providing discharge signals for the objects corresponding to the respective classes of the objects and reject signals for objects which do not fall within the predetermined values;
a plurality of object receiving bins positioned along the conveyor chain means for receiving objects discharged from the conveyor chain means, the bins for receiving objects in classes in which a large number of objects are expected to be classified being longer in the direction of the conveyor chain means than the other bins; and
a plurality of discharge operation devices positioned along said conveyor chain means in positions corresponding to said bins and supplied with the discharge and reject signals from said computing device for being actuated for discharging objects into the respective bins according to classes and discharging the rejected objects separately from the other objects, there being a plurality of discharge operation devices opposite said longer bins.

7. An apparatus as claimed in claim 6 in which each tray device has a plurality of tray portions each of which is tiltably mounted relative to the mounting member on which the tray device is mounted, and each of said tray portions having an engaging mechanism.

8. An apparatus as claimed in claim 7 further comprising a plurality of inspection devices along said conveyor chain means for inspecting the internal quality of the objects being sorted by a non-contact inspection, and grade computing devices for each of said inspection devices respectively connected to said inspection devices and producing grade signals corresponding to the grades of the respective objects, said grade computing devices being connected to said computing device for supplying the grade signals thereto for use in ranking of the objects being sorted, said computing device including means for combining said grade signals with the ranking of the objects for providing a ranking and grade for classifying the articles.

9. An apparatus as claimed in claim 7 further comprising a plurality of inspection devices along said conveyor chain means for inspecting the internal quality of the objects being sorted by a non-contact inspection, and grade computing devices for each of said inspection devices respectively connected to said inspection devices and producing grade signals corresponding to the grades of the respective objects, said grade computing devices being connected to said computing device for supplying the grade signals thereto for use in ranking of the objects being sorted, said computing device including means for combining said grade signals with the ranking of the objects for providing a ranking and grade for classifying the articles.

* * * * *